(12) United States Patent
Noguera

(10) Patent No.: US 6,847,351 B2
(45) Date of Patent: Jan. 25, 2005

(54) TILT-BASED POINTING FOR HAND-HELD DEVICES

(75) Inventor: Gritsko Perez Noguera, San Marcos, CA (US)

(73) Assignee: Siemens Information and Communication Mobile, LLC, San Diego, CA (US)

( * ) Notice: Subject to any disclaimer, the term of this patent is extended or adjusted under 35 U.S.C. 154(b) by 179 days.

(21) Appl. No.: 09/929,224

(22) Filed: Aug. 13, 2001

(65) Prior Publication Data

US 2003/0038778 A1 Feb. 27, 2003

(51) Int. Cl.⁷ .................................. G09G 5/00
(52) U.S. Cl. ...................... 345/158; 345/169; 345/864; 345/857; 345/157
(58) Field of Search ................ 345/156–169, 345/901, 856–862, 864; 341/20, 22; 463/37–38; 348/734

(56) References Cited

U.S. PATENT DOCUMENTS

| | | | |
|---|---|---|---|
| 5,506,605 A | * | 4/1996 | Paley .......................... 345/163 |
| 5,602,566 A | | 2/1997 | Motosyuku et al. ......... 345/123 |
| 5,638,092 A | * | 6/1997 | Eng et al. .................... 345/158 |
| 5,703,623 A | | 12/1997 | Hall et al. ................... 345/158 |
| 6,094,188 A | * | 7/2000 | Horton et al. ............... 345/158 |
| 6,201,554 B1 | | 3/2001 | Lands .......................... 345/169 |
| 6,211,860 B1 | * | 4/2001 | Bunsen ........................ 345/157 |
| 6,219,028 B1 | * | 4/2001 | Simonson .................... 345/862 |
| 6,466,198 B1 | * | 10/2002 | Feinstein ..................... 345/158 |
| 6,567,068 B2 | * | 5/2003 | Rekimoto .................... 345/156 |
| 6,577,296 B2 | * | 6/2003 | Flack .......................... 345/158 |
| 2002/0093483 A1 | * | 7/2002 | Kaplan ........................ 345/158 |

* cited by examiner

Primary Examiner—Lun-Yi Lao

(57) ABSTRACT

Systems and methods of pointing in hand-held devices are described. In accordance with this scheme, a user may control the position where a pointer is displayed on a display screen simply by changing the orientation of the hand-held device relative to a currently preferred device orientation, which is tracked automatically. In addition, unintentional device orientation changes, such as periodic device orientation changes that might be caused by carrying the hand-held device while walking or driving, are filtered out dynamically. In this way, the pointer may be positioned accurately and reliably at any one of a plurality of pointer screen locations based upon changes in device orientation under a wide variety of different usage conditions.

26 Claims, 4 Drawing Sheets

TILT-BASED POINTING FOR HAND-HELD DEVICES

COPYRIGHTABLE MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention relates to systems and methods for hand-held device pointing based upon changes in relative device orientation.

A wide variety of different hand-held devices, such as cellular telephones, cordless telephones, pagers, personal digital assistants (PDAs), solid state digital audio players, CD players, MCD players, cameras and game pads, have been developed to enable users to communicate, process information and playback digital content without being tied to a particular physical location. Hand-held devices typically include one or more input controls and a display screen that is configured to display a graphical user interface, including text and graphics. A pointer is a rectangle, a blinking underline, an arrow or other symbol that allows a user to select commands or options presented by the graphical user interface by positioning the pointer over the desired selection and entering a selection command. In general, the selection command may be entered by tapping on a touch sensitive display screen or by depressing a designated input button.

Many different schemes for scrolling a pointer across a display screen have been proposed. In some approaches, one or more input controls (e.g., up and down keypad buttons, a jog dial or a joystick) may be manually activated to move a pointer across a display screen. In hand-held devices that include touch sensitive display screens, a pointer may be moved across the display screen simply by tapping the screen location where the pointer is to be displayed. In general, manual input based pointer scrolling approaches input involve the use of two hands or require awkward hand positions to control pointer movement.

Several non-manual input based schemes have been proposed for controlling various operations of a hand-held device. For example, U.S. Pat. No. 6,201,554 discloses a hand-held device that includes a tilt sensor that is configured to sense changes in device tilt relative to a reference tilt that is established when a mode selection switch is activated. Depending upon the selected mode of operation (i.e., paging, volume control, brightness control, and zoom), one or more device parameters may be modified in response to signals provided by the sensor that are indicative of tilt direction changes relative to the reference tilt. In a paging mode of operation, windows that are displayed on a display screen may be paged through one at a time in response to tilt direction changes. Similarly, in a brightness or volume control mode of operation, the brightness level or volume level may be modified in response to tilt direction changes. Finally, in a zoom control mode of operation, the magnification at which content is displayed on the display screen may be control by changing the tilt of the hand-held device relative to the reference tilt. In accordance with the approach described in the '554 patent, the level or rate of adjustment of a mode-dependent parameter may be proportional to the relative change in tilt.

In a similar approach, U.S. Pat. No. 5,602,566 describes a hand-held device in which content that is displayed on a display screen may be scrolled through by changing the tilt of the hand-held device relative to a reference tilt direction and relative tilt angle that are established upon activation of a scroll start switch. The scroll direction corresponds to the direction of relative tilt, and the scrolling speed may vary in accordance with the relative tilt angle.

SUMMARY

The present invention features a hand-held device pointer positioning scheme (systems and methods) that allows a user to control where a pointer is displayed on a display screen simply by changing the orientation of the hand-held device, while automatically adjusting to different preferred orientations of the hand-held device. In addition, the invention dynamically filters out unintentional device orientation changes, such as periodic device orientation changes that might be caused by carrying the hand-held device while, for example, walking or driving. In this way, the invention provides a practical scheme for accurately and reliably pointing in hand-held devices based upon changes in device orientation under a wide variety of different usage conditions.

In one aspect, the invention features a hand-held device that includes a display screen, an orientation sensor, and a controller. The display screen is operable to display a pointer at any one of a plurality of pointer screen locations. The orientation sensor is operable to provide an indication of orientation of the hand-held device. The controller is configured to compute a pointer screen location where a pointer is to be displayed on the display screen based upon multiple device orientation indications provided by the orientation sensor over time.

Embodiments of the invention may include one or more of the following features.

In some embodiments, the controller is configured to compute the pointer screen location based upon an average of display screen locations that are derived from the multiple device orientation indications provided by the orientation sensor. The controller may be configured to compute the pointer screen location based upon mappings from device orientation indications provided by the orientation sensor to display screen locations.

The controller preferably is configured to update the computed pointer screen location once every sampling period. In some embodiments, the controller is configured to cause the location where the pointer is displayed on the display screen to be updated once every tracking delay period. The tracking delay period preferably is at least as long as the sampling period. In some embodiments, the controller is configured to increment the computed pointer screen location one unit toward a center display screen location before causing the pointer to be displayed on the display screen. The controller may be configured to compute a tracking delay period based upon changes in device tilt direction from one sampling period to another. For example, the controller may be configured to increase the computed tracking delay period in response to a determination that the device tilt direction is changed from one sampling period to another. The controller also may be configured to decrease the computed tracking delay period in response to a determination that the device tilt direction is unchanged from one sampling period to another.

In some embodiments, the controller is operable to compute an average position of the hand-held device based upon multiple device orientation indications provided by the orientation sensor over time. In accordance with these embodiments, the controller may be operable to compute a relative center position of the display screen based upon the computed average hand-held device position. In addition, the controller may be operable to compute the pointer screen location with respect to the computed relative center position of the display screen.

The invention also features a method of pointing in a hand-held device. In accordance with this inventive method, an indication of orientation of the hand-held device is provided, and a pointer screen location where a pointer is to be displayed on the display screen is computed based upon multiple device orientation indications provided by the orientation sensor over time.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
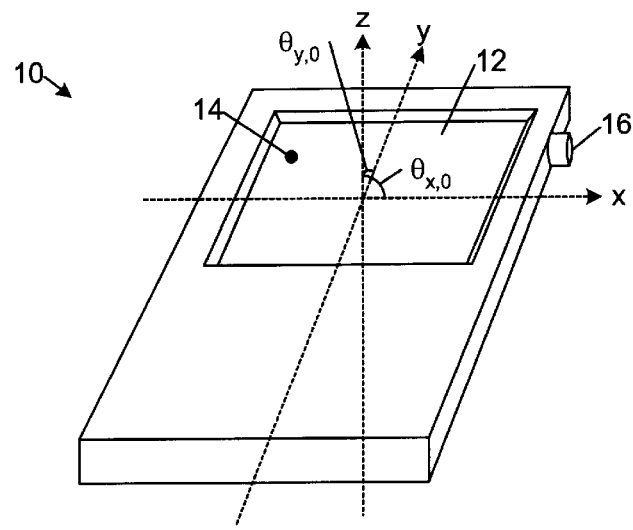
FIG. 1 is a diagrammatic perspective view of a hand-held device having a display screen on which a pointer is displayed.

Referring to FIG. 1, in one embodiment, a hand-held device 10 includes a display screen 12 that is configured to display a graphical user interface, which may present one or more user commands or options for controlling the operation of hand-held device 10. A pointer 14 may be positioned over the options that are presented by the graphical user interface at any one of a plurality of pointer screen locations. A selection button 16 may be depressed to activate a command or option selected by pointer 14. Hand-held device 10 also includes an orientation (or tilt) sensor (e.g., a gravitational accelerometer) that is operable to provide an indication of the orientation of hand-held device 10, and a controller that is configured to compute pointer screen locations where pointer 14 is to be displayed based upon device orientation indications provided by the orientation sensor over time (see FIG. 5).

As explained in detail below, a user may control the position where pointer 14 is displayed on display screen 12 simply by changing the orientation of hand-held device 10 relative to a currently preferred device orientation, which is tracked automatically by hand-held device 10. In addition, hand-held device 10 dynamically filters out unintentional device orientation changes, such as periodic device orientation changes that might be caused by carrying the hand-held device while for example walking or driving. In this way, pointer 14 may be positioned accurately and reliably at any one of a plurality of pointer screen locations based upon changes in device orientation under a wide variety of different usage conditions.

Figure 2A:
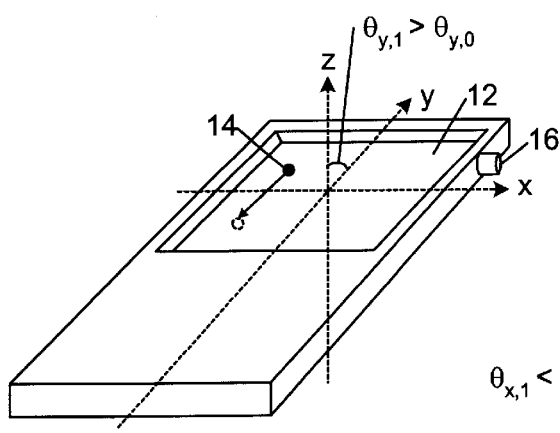
FIG. 2A is a diagrammatic perspective view of the hand-held device of FIG. 1 tilted in a forward (y) direction with respect to a vertical (z) axis.
Figure 2B:
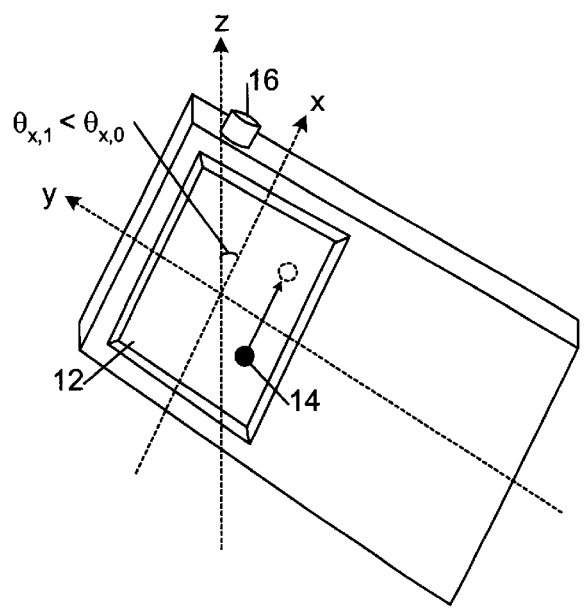
FIG. 2B is a diagrammatic perspective view of the hand-held device of FIG. 1 tilted in a leftward (x) direction with respect to a vertical (z) axis.

Referring to FIGS. 1, 2A and 2B, the current preferred device orientation may be assumed to be the device orientation shown in FIG. 1, with an x-axis tilt angle of $\theta_{x,0}$ and a y-axis tilt angle of $\theta_{y,0}$ relative to the vertical (z) axis. Pointer 14 may be moved controllably from the top left quadrant of displays screen 12 to the lower left quadrant of display screen 12 simply by tilting hand-held device 10 forward along the y-axis to a y-axis tilt angle of $\theta_{y,1}$, which is greater than $\theta_{y,0}$ (FIG. 2A). Similarly, pointer 14 may be moved controllably from the lower left quadrant of display screen 12 to the lower right quadrant of display screen 12 simply by tilting hand-held device 10 to the left along the x-axis to an x-axis tilt angle of $\theta_{x,1}$, which is greater than $\theta_{x,0}$ (FIG. 2B). Pointer 14 may be moved to other pointer screen locations by tilting hand-held device in other directions relative to the vertical (z) axis. By design, pointer 14 also automatically tends to gravitate towards the center of display screen 12. Thus, if hand-held device 10 remains stationary for an extended period, pointer 14 gradually moves to the center of display screen 12.

In some embodiments, a user may be allowed to modify the ways in which the movement of pointer 14 across display screen 12 responds to changes in the orientation of hand-held device 10. For example, a user may be allowed to specify the movement direction of pointer 14 in response to the various tilt directions of hand-held device 10. In addition, a user may be allowed to specify the speed at which the movement of pointer 14 tracks changes in the orientation of hand-held device 10.

Figure 3:
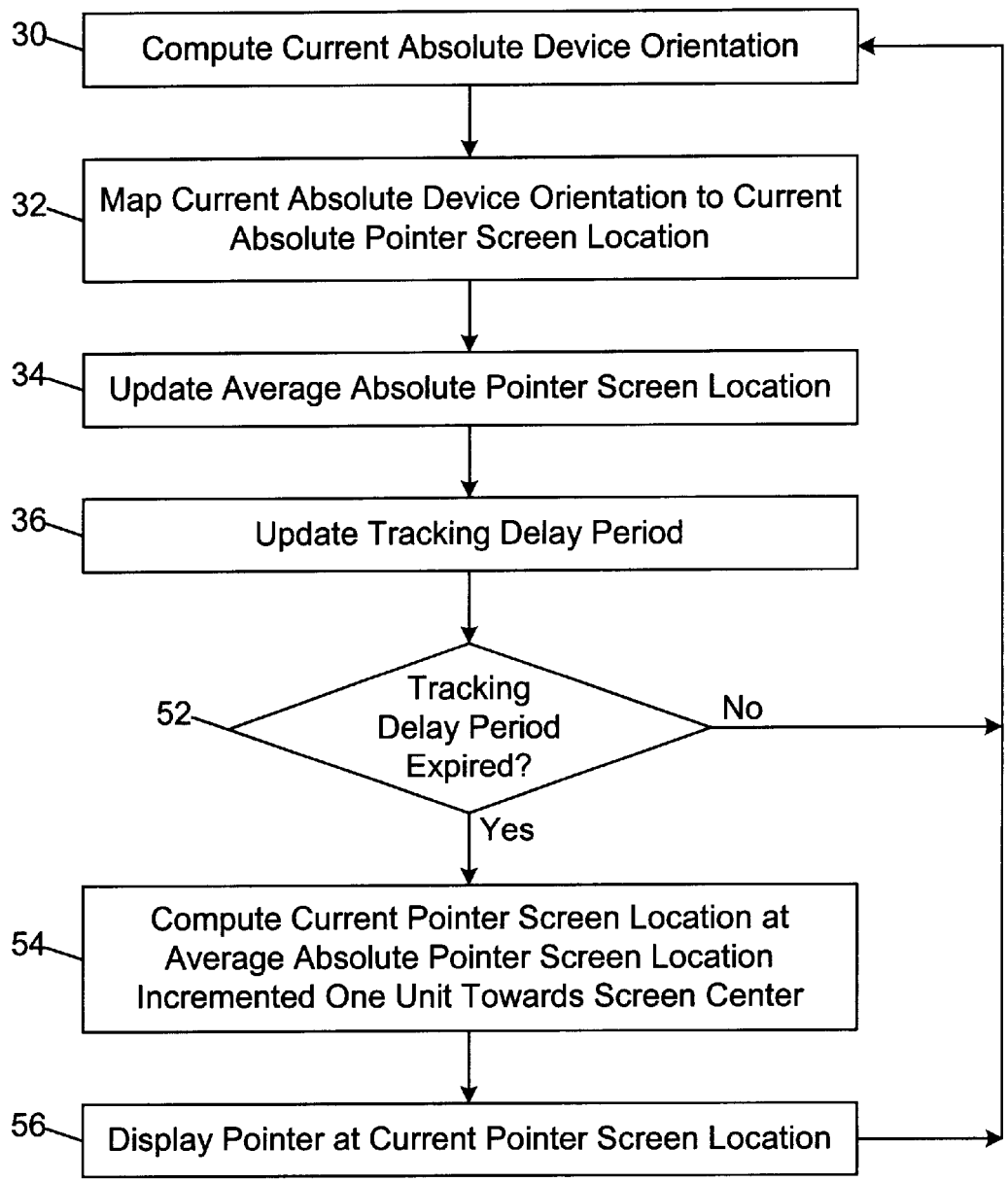
FIG. 3 is a flow diagram of a method of controlling the position of the pointer on the display screen of the hand-held device of FIG. 1.

Referring to FIG. 3, in one embodiment, the position where pointer 14 is displayed on display screen 12 may be controlled as follows. The current absolute orientation of hand-held device 10 is computed based upon an orientation indication provided by the orientation sensor (step 30). The absolute orientation of hand-held device 10 preferably is computed along two axes (e.g., the x- and y-axes) relative to the vertical (z) axis; however, in some embodiments, the absolute device orientation may be computed along only a single axis (e.g., the y-axis). The absolute orientation of hand-held device 10 may be computed in a conventional way. The orientation indications provided by the orientation sensor preferably are sampled at a fixed sampling rate (e.g., 100 samples per second).

The computed absolute device orientation is mapped to a current absolute pointer screen location (step 32). The device orientation-to-screen mapping may be any one-to-one mapping of device orientation to screen location. For example, in one embodiment, the mapping of Table 1 may be used:

TABLE 1

| Angle of X/Y-Axis Relative to Z-Axis | Screen Position Along X-Axis | Screen Position Along Y-Axis |
|---|---|---|
| 0° | Far Right | Top |
| 90° | Center | Center |
| 180° | Far Left | Bottom |

Next, an average of absolute screen pointer locations is updated based upon the computed absolute pointer screen location (step 34). In one embodiment, the average absolute screen pointer location is computed from the 100 most recent samples of absolute screen pointer locations in accordance with the following exemplary C++ pseudocode routine.
© 2001 Siemens Information and Communication Mobile, LLC, All rights reserved.

direction from one sampling period to another. This allows unintentional device orientation changes, such as periodic device orientation changes that might be caused by carrying the hand-held device while walking or driving, to be filtered out dynamically. The current device tilt direction is computed in a conventional way (step 38). If current tilt direction is different from the tilt direction computed in the previous sampling period (step 40), a delay increment is set to +1 (step 42). Otherwise, the delay increment is set to −1 (step 44). If the sum of the tracking delay period computed in the previous sampling period and the delay increment is greater than the sampling period (step 46), the current tracking delay period is set to the sum of the previous tracking delay period and the delay increment (step 48). Otherwise, the current tracking delay period is set to the sampling period (step 50). In this way, the tracking delay period is always at least as

```
# define AccXMax 100
# define AccYMax 100     // average sample count for X and Y coordinates
    unsigned char AccX[AccXMax];
    unsigned char AccY[AccYMax];
    //--Interrupt handler for position averaging, occurs every T_a milliseconds
//(SamplingPeriod = T_a)
    void PositionAverage(void)
    {
    //shift sample arrays
    unsigned char i;
    unsigned int AvgXTotal = 0;
    unsigned int AvgYTotal = 0;
    for ( i = AccXMax − 1; i > −1; i−−)
    AccX [ i + 1 ] = AccX [ i ];
    for ( i = AccYMax − 1; i > −1; i−−)
    AccY [ i + 1 ] = AccY [ i ];
    // push new sample into array
    AccX [ 0 ] = AbsCurrentPositionX;
    AccY [ 0 ] = AbsCurrentPositionY;
    // accumulate
    for ( i = 0; i < AccXMax − 1; i++)
    AvgXTotal += AccX [ i ];
    for ( i = 0; i < AccYMax − 1; i++)
    AvgYTotal += AccY [ i ];
    // average
    AvgXTotal = round(AvgXTotal/AccXMax);
    AvgYTotal = round(AvgYTotal/AccYMax);
    // update cursor position
    AbsCurrentPositionX = AvgXTotal;
    AbsCurrentPositionY = AvgYTotal;
    }
```

A pointer tracking delay period also is updated based upon the computed absolute pointer screen location (step 36).

Figure 4:
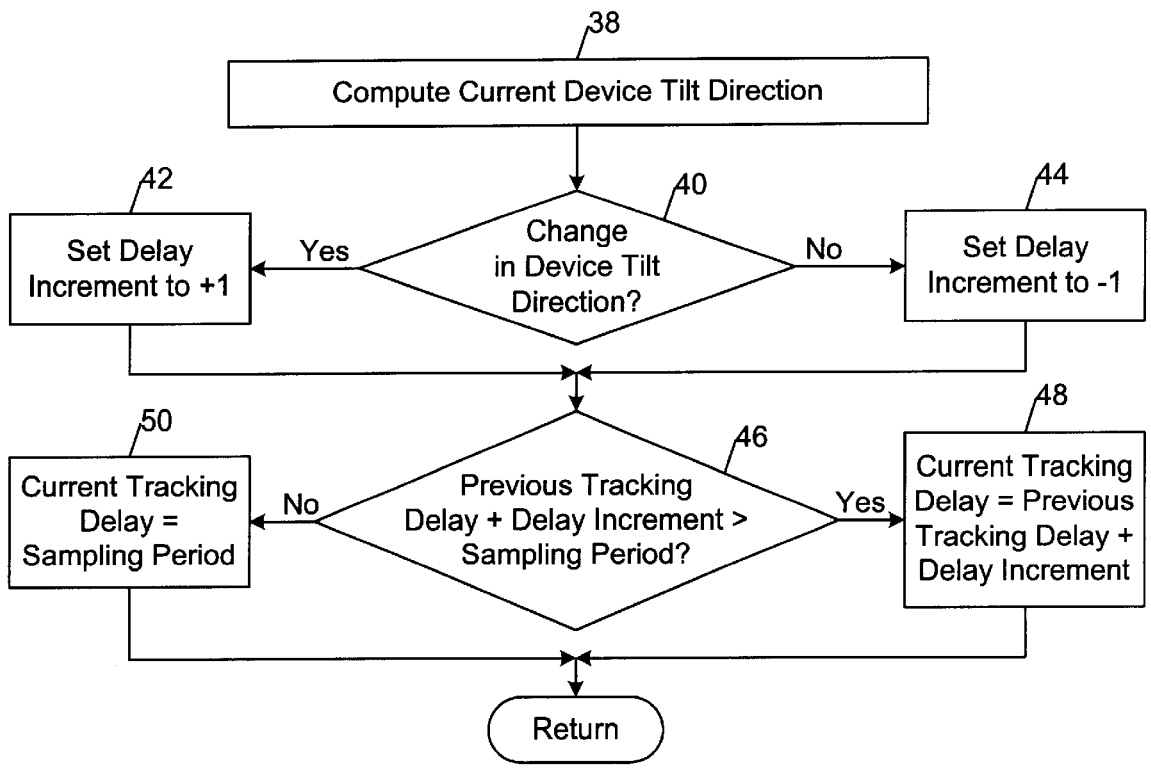
FIG. 4 is a flow diagram of a method of updating a tracking delay period based upon changes in the tilt direction of the hand-held device of FIG. 1 from one sampling period to another.

As shown in FIG. 4, in one embodiment, the tracking delay period may be responsive to changes in device tilt long as the sampling period. In one embodiment, the tracking delay period may be computed in accordance with the following exemplary C++ pseudocode routine.
© Siemens Information and Communication Mobile, LLC, All rights reserved.

```
void CalculateTrackingDelayFactor(void)
{
    // determine if the cursor change relative to the previous position is negative or
//positive,
        // 0 if no change, −1 if negative change and 1 if positive change
        XCurrentSign = AbsPrevPositionX − AbsCurrentPositionX;
        if (XCurrentSign)
        {
        XCurrentSign = XCurrentSign/abs(XCurrentSign);
        XDelayFactor = − (XPrevSign * XCurrentSign);
        // store data for next interrupt
```

```
  XPrevSign = XCurrentSign;
  AbsPrevPositionX = AbsCurrentPositionX;
  }
YCurrentSign = AbsPrevPositionY - AbsCurrentPositionY;
if (YCurrentSign)
  {
  YCurrentSign = YCurrentSign/abs(YCurrentSign);
  YDelayFactor = - (YPrevSign * YCurrentSign);
  // store data for next interrupt
  YPrevSign = YCurrentSign;
  AbsPrevPositionY = AbsCurrentPositionY;
  }
//if there is a change in direction, DelayFactor becomes 1, otherwise -1
DelayFactor = DelayXFactor | DelayYFactor;
// make sure the tracking delay is never smaller than the sampling period
TrackingDelay = (TrackingDelay + DelayFactor > SamplingPeriod)?
TrackingDelay + DelayFactor : SamplingPeriod;
}
```

Referring back to FIG. 3, if the tracking delay period has not expired (step 52), an orientation indication provided by the orientation sensor is sampled and the current absolute orientation of hand-held device 10 is computed (step 30). Otherwise, the current pointer screen location is computed at the average absolute pointer screen location incremented one unit (e.g., one pixel) towards the center of display screen 12 (step 54). In one embodiment, the current pointer screen location may be computed in accordance with the following exemplary C++ pseudocode routine.
© Siemens Information and Communication Mobile, LLC, All rights reserved.

```
#define ScreenWidth  256
#define ScreenHeight 256 // assume the display is 256 pixels wide by 256 pixels high
#define CenterX    128
#define CenterY    128 //the center X and Y position are half of the display
//dimensions
//-- Interrupt handler for cursor center positioning, occurs every T_d milliseconds
//(TrackingDelay = T_d)
void PositionCenter(void)
{
  // determine if the cursor position relative to the center is negative or positive
  IncXFactor = CenterX - AbsCurrentPositionX;
  IncYFactor = CenterY - AbsCurrentPositionY;
  // determine if the step increment for X and Y towards the center is +1 or -1
  IncXFactor = IncXFactor/abs(IncXFactor);
  IncYFactor = IncYFactor/abs(IncYFactor);
  // move the cursor one step every interrupt
  CurrentPositionX += IncXFactor;
  CurrentPositionY += IncYFactor;
}
```

Pointer 14 is displayed at the computed current screen pointer location (step 56), and the process is repeated (step 30).

Figure 5:
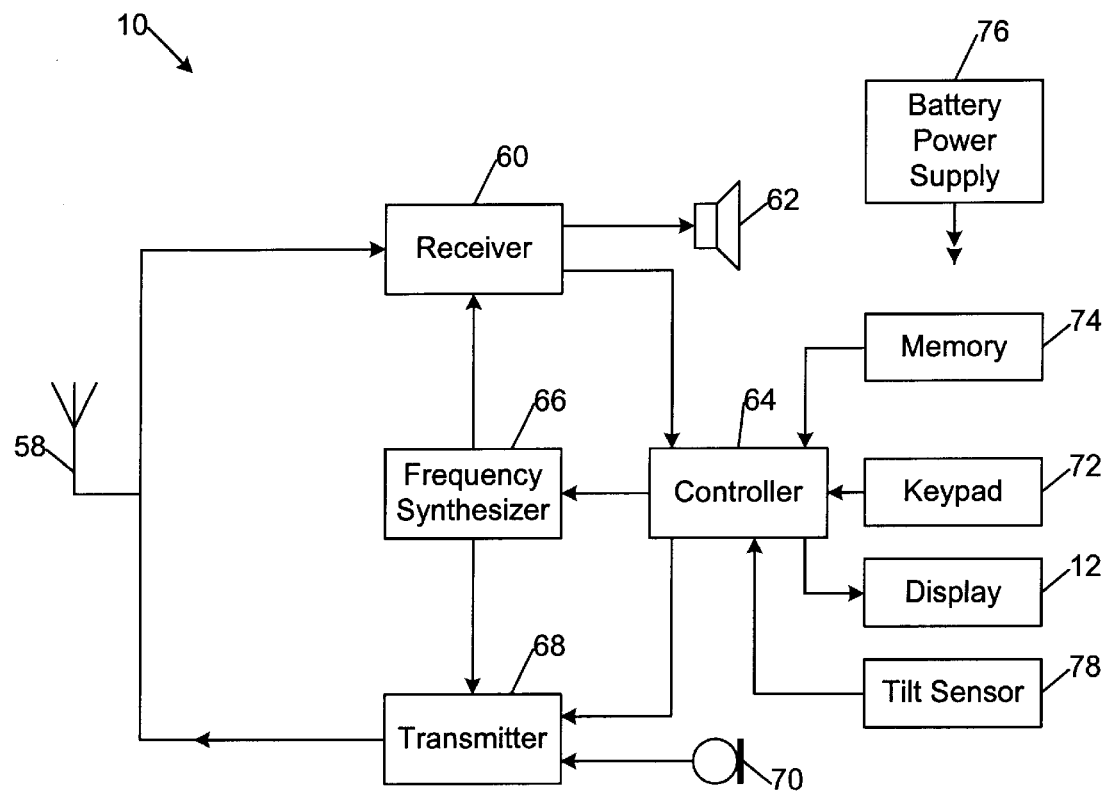
FIG. 5 is a schematic diagram of the hand-held device of FIG. 1 implemented as a cellular telephone.

Referring to FIG. 5, in one embodiment, hand-held device 10 may be implemented as a cellular telephone that includes an antenna 58, a receiver 60, a speaker 62, a controller 64, a frequency synthesizer 66, a transmitter 68, a microphone 70, a keypad 72, a display 12, a memory 74, and a battery power supply 76. Hand-held device 10 also includes a tilt sensor 78 (e.g., an ADXL202 two-axis acceleration sensor available from Analog Devices, Inc. of Norwood, Mass., U.S.A.) that is operable to provide indications of the current orientation of hand-held device 10 along two orthogonal axes relative to a vertical axis. Controller 64 choreographs the operation of receiver 60, transmitter 68, and frequency synthesizer 66. Frequency synthesizer 66 controls the operating frequencies of receiver 60 and transmitter 68, and generates electronic radio frequency signals in response to control signals received from controller 64.

In general, hand-held device 10 may be implemented as any one of a wide variety of different portable electronic devices, including a cellular telephone, a cordless telephone, a pager, a personal digital assistant (PDA), a solid state digital audio player, a CD or MCD player, a camera, and a game pad. Hand-held device 10 also may include various implementation-dependent user controls, including a play button, a stop button, a fast forward/next selection button, a rewind/previous selection button, and a volume control dial. In addition, hand-held device 10 may have an output port for connecting to an input jack of an audio output device (e.g., headphones), and a cable port for connecting to a computer or other hardware system. In some embodiments, hand-held device 10 may include a wireless communication port, for example, an IrDA (Infrared Data Association) port, through which hand-held device 10 may wirelessly exchange data with other similarly configured devices, including other hand-held devices. Some embodiments may include an RF antenna instead of, or in addition to, a wireless communication port.

The systems and methods described herein are not limited to any particular hardware or software configuration, but rather they may be implemented in any computing or processing environment, including in digital electronic circuitry or in computer hardware, firmware or software. The controller may be implemented, in part, in a computer program product tangibly embodied in a machine-readable storage device for execution by a computer processor. In some embodiments, the controller preferably is implemented in a high level procedural or object oriented programming language; however, the algorithms may be implemented in assembly or machine language, if desired. In any case, the programming language may be a compiled or interpreted language. The methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Other embodiments are within the scope of the claims. In some embodiments, the position where pointer 14 is displayed on display screen 12 may be controlled based upon the relative positions of handheld device 10 rather than the absolute positions of handheld device 10. For example, the relative center position of display screen 12 may be computed with respect to the computed average position of handheld device 10. The position where pointer 14 is displayed on display screen 12 then may be computed with respect to the computed relative center position of display screen 12.

Still other embodiments are within the scope of the claims.

What is claimed is:

1. A hand-held device, comprising:
    a display screen operable to display a pointer at any one of a plurality of pointer screen locations;
    an orientation sensor operable to provide an indication of orientation of the hand held device; and
    a controller configured to compute a pointer screen location where a pointer is to be displayed on the display screen based upon multiple device orientation indications provided by the orientation sensor over time;
    wherein the controller is operable to compute an average position of the hand-held device based upon multiple device orientation indications provided by the orientation sensor over time, the controller is operable to compute a relative center position of the display screen based upon the computed average hand-held device position, and the controller is operable to compute the pointer screen location with respect to the computed relative center position of the display screen.

2. The hand-held device of claim 1, wherein the controller is configured to compute the pointer screen location based upon an average of display screen locations derived from the multiple device orientation indications provided by the orientation sensor.

3. The hand-held device of claim 2, wherein the controller is configured to compute the pointer screen location based upon mappings from device orientation indications provided by the orientation sensor to display screen locations.

4. The hand-held device of claim 1, wherein the controller is configured to update the computed pointer screen location once every sampling period.

5. The hand-held device of claim 4, wherein the controller is configured to cause the location where the pointer is displayed on the display screen to be updated once every tracking delay period.

6. The hand-held device of claim 5, wherein the tracking delay period is at least as long as the sampling period.

7. A hand-held device, comprising:
    a display screen operable to display a pointer at any one of a plurality of pointer screen locations;
    an orientation sensor operable to provide an indication of orientation of the hand held device; and
    a controller configured to compute a pointer screen location where a pointer is to be displayed on the display screen based upon multiple device orientation indications provided by the orientation sensor over time;
    wherein the controller is configured to update the computed pointer screen location once every sampling period, and the controller is configured to cause the location where the pointer is displayed on the display screen to be updated once every tracking delay period; and
    wherein the controller is configured to increment the computed pointer screen location one unit toward a center display screen location before causing the pointer to be displayed on the display screen.

8. A hand-held device, comprising:
    a display screen operable to display a pointer at any one of a plurality of pointer screen locations;
    an orientation sensor operable to provide an indication of orientation of the hand held device; and
    a controller configured to compute a pointer screen location where a pointer is to be displayed on the display screen based upon multiple device orientation indications provided by the orientation sensor over time;
    wherein the controller is configured to update the computed pointer screen location once every sampling period, and the controller is configured to cause the location where the pointer is displayed on the display screen to be updated once every tracking delay period; and
    wherein the controller is configured to compute a tracking delay period based upon changes in device tilt direction from one sampling period to another.

9. The hand-held device of claim 8, wherein the controller is configured to increase the computed tracking delay period in response to a determination that the device tilt direction is changed from one sampling period to another.

10. The hand-held device of claim 8, wherein the controller is configured to decrease the computed tracking delay period in response to a determination that the device tilt direction is unchanged from one sampling period to another.

11. A method of pointing in a hand-held device, comprising:
    providing an indication of orientation of the hand-held device;
    computing a pointer screen location where a pointer is to be displayed on a display screen based upon multiple device orientation indications provided by an orientation sensor over time;
    computing an average position of the hand-held device based upon multiple device orientation indications provided by the orientation sensor over time;

computing a relative center position of the display screen based upon the computed average hand-held device position; and computing the pointer screen location with respect to the computed relative center position of the display screen.

12. The method claim 11, wherein the pointer screen location is computed based upon an average of display screen locations derived from the multiple device orientation indications provided by the orientation sensor.

13. The method of claim 12, wherein the pointer screen location is computed based upon mappings from device orientation indications provided by the orientation sensor to display screen locations.

14. The method of claim 11, wherein the computed pointer screen location is updated once every sampling period.

15. The method of claim 14, further comprising updating the location wherein the pointer is displayed on the display screen once every tracking delay period.

16. The method of claim 15, wherein the tracking delay period is at least as long as the sampling period.

17. A method of pointing in a hand-held device, comprising:

providing an indication of orientation of the hand-held device; and computing a pointer screen location where a pointer is to be displayed on a display screen based upon multiple device orientation indications provided by an orientation sensor over time, wherein the computed pointer screen location is updated once every sampling period; and updating the location wherein the pointer is displayed on the display screen once every tracking delay period;

further comprising incrementing the computed pointer screen location one unit toward a center display screen location before the pointer is displayed on the display screen.

18. A method of pointing in a hand-held device, comprising:

providing an indication of orientation of the hand-held device; and computing a pointer screen location where a pointer is to be displayed on a display screen based upon multiple device orientation indications provided by an orientation sensor over time, wherein the computed pointer screen location is updated once every sampling period; and updating the location wherein the pointer is displayed on the display screen once every tracking delay period;

further comprising computing a tracking delay period based upon changes in device tilt direction from one sampling period to another.

19. The method of claim 18, further comprising increasing the computed tracking delay period in response to a determination that the device tilt direction is changed from one sampling period to another.

20. The method of claim 18, further comprising decreasing the computed tracking delay period in response to a determination that the device tilt direction is unchanged from one sampling period to another.

21. A hand-held device, comprising:

a display screen;

an orientation sensor configured to provide an indication of orientation of the hand-held device; and a controller configured to compute a pointer screen location based on device orientation indications provided by the orientation sensor over a period of time and to display a pointer at the pointer screen location on the display screen, wherein length of time between successive pointer screen locations computed and displayed depends at least in part on whether a change in tilt direction of the hand-held device has occurred.

22. The hand-held device of claim 21, wherein the controller is configured to increase the length of time in response to a change in device tilt direction.

23. The hand-held device of claim 21, wherein the controller is configured to decrease the length of time in response to a lack of change in device tilt direction across two sampling periods, wherein the length of time includes one or more sampling periods.

24. A method of pointing in a hand-held device, comprising:

providing indications of orientation of the hand-held device over time; and computing a pointer screen location based on the provided device orientation indications and displaying a pointer on a display screen at the pointer screen location;

wherein the computing and displaying step includes determining an amount of time from which device orientation indications can be used in computing and displaying the pointer screen location, the determining being based on whether a change in tilt direction of the hand-held device has occurred.

25. The method of claim 24, wherein the computing step comprises increasing the amount of time in response to a change in tilt direction of the hand-held device.

26. The method of claim 24, wherein the computing step comprises decreasing the amount of time in response to a lack of change in tilt direction of the hand-held device across two sampling periods, wherein the amount of time includes one or more sampling periods.

* * * * *